United States Patent
Wasserman et al.

(10) Patent No.: US 12,164,431 B2
(45) Date of Patent: Dec. 10, 2024

(54) MANAGING PREFETCHING OPERATIONS FOR DRIVES IN DISTRIBUTED STORAGE SYSTEMS

(71) Applicant: RED HAT, INC., Raleigh, NC (US)

(72) Inventors: Orit Wasserman, Mitzpe Aviv (IL); Yehoshua Salomon, Kfar Saba (IL); Gabriel Zvi BenHanokh, Tel-Aviv (IL)

(73) Assignee: Red Hat, Inc., Raleigh, NC (US)

( * ) Notice: Subject to any disclaimer, the term of this patent is extended or adjusted under 35 U.S.C. 154(b) by 72 days.

(21) Appl. No.: 17/538,378

(22) Filed: Nov. 30, 2021

(65) Prior Publication Data
US 2023/0169008 A1    Jun. 1, 2023

(51) Int. Cl.
*G06F 12/0866* (2016.01)
*G06F 12/0862* (2016.01)

(52) U.S. Cl.
CPC ...... *G06F 12/0866* (2013.01); *G06F 12/0862* (2013.01); *G06F 2212/602* (2013.01); *G06F 2212/6022* (2013.01)

(58) Field of Classification Search
CPC ............ G06F 12/0862; G06F 12/0866; G06F 2212/602; G06F 2212/6022
See application file for complete search history.

(56) References Cited

U.S. PATENT DOCUMENTS

| | | | |
|---|---|---|---|
| 6,938,146 B2 | 8/2005 | Shafi et al. | |
| 8,006,111 B1 | 8/2011 | Faibish et al. | |
| 8,036,076 B2 | 10/2011 | Idei et al. | |
| 8,904,088 B2 | 12/2014 | Heo et al. | |
| 9,081,691 B1* | 7/2015 | Gupta | G06F 11/1441 |
| 9,448,732 B1* | 9/2016 | Sahin | G06F 12/0866 |
| 2005/0144486 A1* | 6/2005 | Komarla | G06F 1/3203 |
| | | | 713/300 |
| 2009/0112894 A1* | 4/2009 | Idei | G11B 19/02 |
| 2009/0187715 A1* | 7/2009 | Sajayan | G06F 12/0862 |
| | | | 711/E12.001 |
| 2010/0211745 A1* | 8/2010 | Jeddeloh | G06F 12/0875 |
| | | | 713/340 |

(Continued)

OTHER PUBLICATIONS

Power Off. Article [online]. Technopedia, Feb. 20, 2020 [retrieved on Nov. 23, 2022]. Retrieved from the Internet: <URL: https://web.archive.org/web/20200226193336/https://www.techopedia.com/definition/2287/power-off#expand> (Year: 2020).*

(Continued)

*Primary Examiner* — Chie Yew
(74) *Attorney, Agent, or Firm* — Kilpatrick Townsend & Stockton LLP (57) ABSTRACT

Systems and methods are provided for managing prefetching operations for read requests for drives in a distributed storage system. For example, a system can determine that a first drive of a plurality of drives is powered on. Prior to receiving a read request for reading a first set of data from the first drive, the system can enable a prefetching operation for prefetching the first set of data from the first drive to be written to a cache. The system may power off the first drive. The system may receive a read request for reading the first set of data from the first drive of a plurality of drives. In response to receiving the read request, the system may read the first set of data from the cache.

20 Claims, 3 Drawing Sheets

(56) References Cited

U.S. PATENT DOCUMENTS

| | | | |
|---|---|---|---|
| 2011/0219190 A1* | 9/2011 | Ng | G06F 12/0868 |
| | | | 711/E12.024 |
| 2015/0100810 A1 | 4/2015 | Sreekumaran et al. | |
| 2016/0034023 A1 | 2/2016 | Arora et al. | |
| 2020/0201571 A1* | 6/2020 | Jung | G06F 12/0862 |
| 2022/0230695 A1* | 7/2022 | Park | G11C 11/5628 |
| 2022/0318141 A1* | 10/2022 | Vankamamidi | G06F 12/0802 |

OTHER PUBLICATIONS

Papathanasiou, A.E. and Scott, M.L., "Energy Efficient Prefetching and Caching," USENIX, 2004, http://citeseerx.ist.psu.edu/viewdoc/download?doi=10.1.1.297.7518&rep=rep1&type=pdf.
Prada L., et al., "Power Saving-Aware Prefetching for SSD-Based Systems," J Supercomput, 2011, https://www.academia.edu/8987641/Power_saving_aware_prefetching_for_SSD_based_systems.

\* cited by examiner

MANAGING PREFETCHING OPERATIONS FOR DRIVES IN DISTRIBUTED STORAGE SYSTEMS

TECHNICAL FIELD

The present disclosure relates generally to distributed storage systems. More specifically, but not by way of limitation, this disclosure relates to managing prefetching operations for drives in distributed storage systems.

BACKGROUND

Distributed storage systems can include various types of memory devices, such as drives and caches, for storing data objects. A distributed storage system may write data onto and read data from the memory devices. In some examples, distributed storage systems may power off drives after a period of drive read and write inactivity. Caches may have a relatively low latency compared to drives and may be non-volatile (i.e., a cache can retain its data when powered off). Reading and writing data to a cache may be faster and less computationally expensive than reading and writing data to a drive.

In some examples, a distributed storage system may use prefetching operations. Prefetching operations may include writing data stored in a drive to a cache before receiving a read request. The prefetched data may be data that is determined to be likely to be requested in a future read request. When a read request is received that requests the prefetched data, the distributed storage system may read the prefetched data from the cache, rather than reading the data from the drive.

DETAILED DESCRIPTION

A distributed storage system may receive requests, such as from a client system, to read or write data to drives in the distributed storage system. In some examples, the distributed storage system may power off drives storing data based on drive inactivity. Drives may consume a significant amount of power when powered on. A drive that is powered off may be powered on in response to a read or write request. But distributed storage systems may include high numbers of drives, and powering drives on and off for individual read requests may increase power consumption and increase latency for the distributed storage system. Additionally, some distributed storage systems utilize prefetching operations to prefetch data from drives to the cache before receiving read requests. But data can only be prefetched from drives that are powered on, and powering on drives solely to prefetch data that may or may not be requested in future read requests may additionally increase power consumption and latency for the distributed storage system.

For example, the system may determine that data stored on a drive is likely to be requested in a future read request. The system may write the data to the cache from the drive for easier and faster access if a read request for the data is received. Rather than reading the data from the drive, which may have to be powered on, the data may be read from the cache instead. Reading from or writing to the cache may be less computationally expensive than reading from or writing to the drive. While drives in the system are powered on, the system may increase prefetching operations for data that is likely to be requested in future read requests. This may aid in reducing latency if the system does later receive read requests for the prefetched data. Additionally, the system may disable prefetching operations for drives that are powered down. This may reduce consumption of computing resources by preventing excessive powering up of drives to prefetch data that may not be requested.

In one particular example, the system may perform prefetching operations for data stored in drives that are powered on. After performing prefetching operations, the system may power the drives off. The drives may remain powered off until the system determines that the drives should be powered on. For example, the system may additionally store pending data from write requests for a powered-off drive to a cache until the drive is powered on. Rather than powering on a drive for a single write request, the drive may remain in an idle state until the system determines that the drive should be powered on. The drive may be powered on in response to an incoming read request or in response to the system receiving a threshold amount of write requests. The system may then write all of the pending data stored in the cache to the drives at once. The system may perform prefetching operations while the drive is powered on.

In some examples, the system may receive a write request from a client device. The write request may direct the distributed storage system to write data to a particular drive. The particular drive may be powered off. In some examples, instead of powering up the drive and writing the data to the drive, the system may write the data to a cache. The system may continue to receive write requests from the client device and responsively write data to the cache. After a threshold number of write requests has been received, the system may power up the drive and write all of the data stored in the cache from the write requests to the drive at once. Additionally or alternatively, the system may power up the drive and write all of the cache stored data to the drive after the cache storage exceeds a storage threshold. While the drive is powered on, the system may also perform prefetching operations to write additional data from the drive to the cache.

In other examples, the system may identify a second drive that is powered on after receiving a write request from the client device. The system may write the data associated with the write request to the second drive. The data may be stored in the second drive until the first drive is powered on. In some examples, the drive may be powered on in response to receiving a read request for the drive from the client device. The system may promptly process read requests, in contrast with the delayed processing of write requests described herein.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
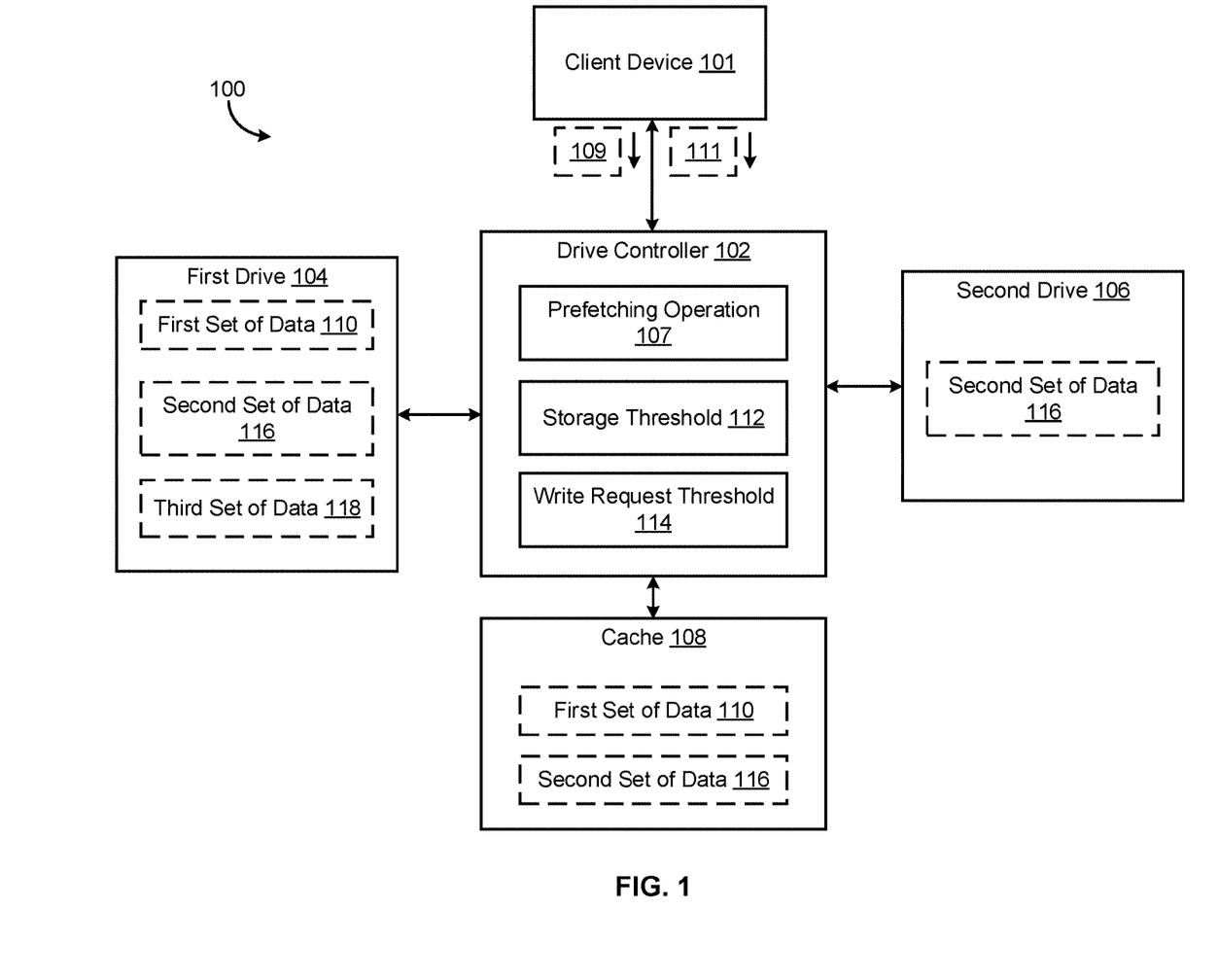
FIG. 1 is a block diagram of an example of a distributed storage system for managing prefetching operations for drives according to some aspects of the present disclosure.

FIG. 1 is a block diagram of an example of a distributed storage system 100 for managing prefetching operations 107 for drives according to some aspects of the present disclosure. The distributed storage system 100 may include a client device 101, a drive controller 102, a first drive 104, a second drive 106, and a cache 108. Examples of the client device 101 can include a laptop computer, desktop computer, server, mobile phone, etc. Examples of the first drive 104 and the second drive 106 can include a hard disk drive, solid-state drive, etc. In some examples, the second drive 106 may be a spool drive. The cache 108 may be a cache memory, random access memory (RAM), flash memory, etc. While some examples of the drives and the cache 108 are provided, the cache 108 may be any type of memory that is faster than the first drive 104 and the second drive 106. In some examples, the cache 108 may be a battery-backed cache or a non-volatile random-access memory that may retain data if the distributed storage system 100 is powered off. The drive controller 102 may coordinate reading or writing of data to the drives and the cache 108, including prefetching operations 107. Some or all of the components of FIG. 1 may communicate with one another via a network, such as a local area network (LAN) or the Internet.

In one example, the drive controller 102 may execute a prefetching operation 107 for prefetching data that may be requested in a future read request from the client device 101. A prefetching operation 107 can involve writing data to the cache 108 from data stored in a drive, such as the first drive 104 or the second drive 106, before receiving a read request for that data. When a read request 109 for that data is received, the data may be read from the cache 108 rather than from a drive. Reading data from the cache 108 may be faster and easier than reading from the drive. But, a prefetching operation 107 may require its associated drive to be powered on, and in some examples prefetching operations 107 may not distinguish between drives that are powered on and drives that are powered off. It may be beneficial to prioritize prefetching operations 107 for drives that are powered on, and disable prefetching operations 107 for drives that are not powered on. While a drive is powered on, such as in response to a read request 109, the drive controller 102 may increase the number of prefetching operations 107 for data stored in that drive. When the drive is powered off, such as for read/write inactivity, the drive controller 102 may prevent prefetching operations 107 for data in that drive.

For example, the drive controller 102 may determine, such as through a machine-learning process, that the client device 101 is likely to send a read request 109 for a first set of data 110 stored in the first drive 104. If the drive controller 102 determines that the first drive 104 is powered off, the drive controller 102 may disable a prefetching operation 107 for the first drive 104 to keep the first drive 104 powered off as long as possible to reduce consumption of computing resources. If the drive controller 102 determines that the first drive 104 is powered on, the drive controller 102 may enable a prefetching operation 107 for prefetching the first set of data 110 from the first drive 104 and writing the first set of data 110 to the cache 108. In some examples, the client device 101 may send a read request 109 for the first set of data 110 from the first drive 104. The drive controller 102 may then read the first set of data 110 from the cache 108 rather than from the first drive 104, which may be powered off. In this manner, the processor 202 can significantly increase the number of prefetching operations 107 performed for drives that are powered on to allow those drives to then remain powered off for longer periods of time.

In another example, the first drive 104 may be powered off and the second drive 106 may be powered on. The drive controller 102 may receive one or more write requests 111 from a client device 101. The write requests 111 may direct the drive controller 102 to write a second set of data 116 to the first drive 104. Instead of powering on the first drive 104 to write the second set of data 116 thereto, the drive controller 102 may write the second set of data 116 to the cache 108. Additionally or alternatively, the drive controller 102 may write the second set of data 116 to the second drive 106.

In some examples, some or all data from the second set of data 116 may be replicated and written to one or more drives that are powered. For example, at least one data unit from the second set of data 116 can be replicated and written to the cache 108 and the second drive 106. When the first drive 104 is powered on, the drive controller 102 may write the second set of data 116 to the first drive 104 from the cache 108 or the second drive 106. The drive controller 102 may determine which instance of the second set of data 116 to access for writing to the first drive 104. For example, if the second drive 106 is powered off, the drive controller 102 may write the second set of data 116 to the first drive 104 from the cache 108, to avoid powering on the second drive 106. Alternatively, if the second set of data 116 in the cache 108 is corrupted or is lost, the drive controller 102 may write the second set of data 116 to the first drive 104 from the second drive 106. In some examples, the drive controller 102 may determine which instance of the second set of data 116 is easier or faster to access. In this example, the drive controller 102 may access the second set of data 116 stored in the cache 108 faster than the second set of data 116 stored in the second drive 106. Thus, the drive controller 102 may access the second set of data 116 from the cache 108 to write to the first drive 104 after the first drive 104 is powered on.

Additionally or alternatively, the first set of data 110 may be erasure coded. For example, the drive controller 102 may split a particular data from the second set of data 116 into multiple fragments. Some or all of the fragments may be encoded with additional data so that the original data can be reconstructed if some of the fragments become corrupted or are lost. Individual fragments may be distributed to different memory devices in the distributed storage system 100 that are powered on, such as the cache 108 or the second drive 106. In some examples, after the first drive 104 is powered on, the drive controller 102 may extract the second set of data 116 using one or more fragments stored in the cache 108 or in the second drive 106. The drive controller 102 may determine the number of fragments needed to extract the second set of data 116 by using the total number of fragments, N, and the size of each fragment, K. Each fragment may have 1/K portion of the second set of data 116. If each fragment was stored in a different drive, only K fragments may be needed to extract the full second set of data 116. Therefore, the fragments stored on N−K number of drives may be unavailable due to drives being powered off, losing power, etc., and the drive controller 102 can extract the full second set of data 116 from the remaining drives. For example, the second set of data 116 may be fragmented into four fragments, with N=4. Each data fragment may include ½ of the data from the second set of data 116, with K=2. Thus, N−K=2. If the data fragments in more than a certain limit of drives, such as two drives, are available to the drive controller 102, the data fragments may remain stored in the drives without writing to the first drive 104. If less than certain limit of drives are available to the drive controller 102, the drive controller 102 may power on the first drive 104, extract the second set of data 116 from the data fragments, and write the second set of data 116 to the first drive 104.

The first drive 104 may be powered off until the drive controller 102 determines that the second set of data 116 should be written to the first drive 104. The second set of data 116 may be stored on the cache 108 or the second drive 106 until the first drive 104 is powered on. In some examples, the drive controller 102 may determine that the storage amount in the cache 108 exceeds a storage threshold 112. The storage threshold may be predetermined, such as by a user of the client device 101 or the distributed storage system 100. In response to determining that the storage threshold 112 has been exceeded, the drive controller 102 may power on the first drive 104. The drive controller 102 may then write the second set of data 116 to the first drive 104 from the cache, thus freeing up storage space in the cache 108. Additionally or alternatively, the drive controller 102 may not power on the first drive 104 and may instead write the second set of data 116 to the second drive 106 to free up storage space in the cache 108. The drive controller 102 may write the second set of data 116 to the first drive 104 from the second drive 106 after the first drive 104 is powered on.

In other examples, the drive controller 102 may determine that a number of write requests 111 received from the client device 101 exceeds a write request threshold 114. The write request threshold 114 may be predetermined, such as by a user of the client device 101 or the distributed storage system 100. In response to determining that the write request threshold 114 has been exceeded, the drive controller 102 may power on the first drive 104. The drive controller 102 may then write the second set of data 116 to the first drive 104, either from the cache 108, the second drive 106, or from a combination thereof.

Alternatively or additionally, the drive controller 102 may power on the first drive 104 in response to receiving a read request 109 from the client device 101 for reading a third set of data 118 stored on the first drive 104. The drive controller 102 may read the third set of data 118 from the first drive 104. While the first drive 104 is powered on from the read request 109, the drive controller 102 may write the second set of data 116 to the first drive 104, either from the cache 108, the second drive 106, or from a combination thereof.

FIG. 1 is illustrative and non-limiting. Other examples may include more components, fewer components, different components, or a different arrangement of the components shown in FIG. 1. For example, although the distributed storage system 100 includes one client device, two drives, and one cache in the example of FIG. 1, the distributed storage system 100 may include any number of client devices, drives, or caches in other examples.

Figure 2:
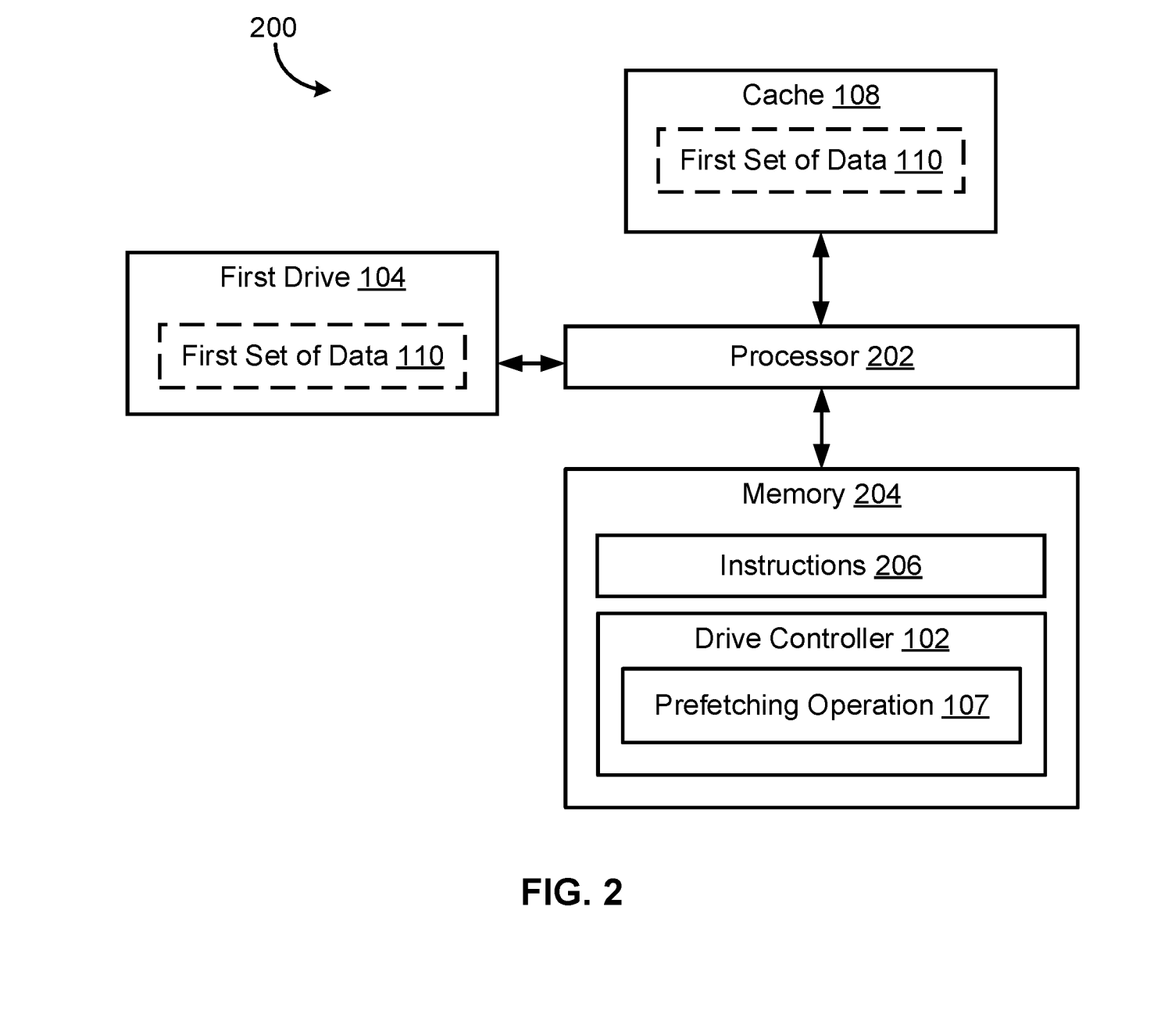
FIG. 2 is a block diagram of another example of a distributed storage system for managing prefetching operations for drives according to some aspects of the present disclosure.

FIG. 2 is block diagram of another example of a distributed storage system 200 for managing prefetching operations 107 for drives according to some aspects of the present disclosure. The distributed storage system 200 includes a processor 202 that is communicatively coupled with a memory 204. The processor 202 may also be communicatively coupled to a first drive 104, a second drive 106, and a cache 108. In some examples, the components of FIG. 2 can be included in the same housing and form part of a same computing device. In other examples, the components of FIG. 2 can be distributed from (e.g., remote to) one another.

The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. The instructions can include processor-specific instructions generated by a compiler or an interpreter from code written in any suitable computer-programming language, such as C, C++, C#, etc.

The memory 204 can include one memory or multiple memories. Non-limiting examples of the memory 204 can include electrically erasable and programmable read-only memory (EEPROM), flash memory, or any other type of non-volatile memory. At least some of the memory 204 includes a non-transitory computer-readable medium from which the processor 202 can read the instructions 206. The non-transitory computer-readable medium can include electronic, optical, magnetic, or other storage devices capable of providing the processor 202 with computer-readable instructions or other program code. Examples of the non-transitory computer-readable medium can include magnetic disks, memory chips, ROM, random-access memory (RAM), an ASIC, optical storage, or any other medium from which a computer processor can read the instructions 206.

In some examples, the processor 202 can execute the instructions 206 to perform operations. For example, the processor may execute the drive controller 102 to coordinate prefetching operations 107, read requests 109, and write requests 111 for the first drive 104, the second drive 106, and the cache 108. The processor 202 may determine that the first drive 104 is powered on. Prior to receiving a read request 109 for reading a first set of data 110 from the first drive 104, the processor 202 may enable a prefetching operation 107 for prefetching the first set of data 110 from the first drive 104 to be written to the cache 108. The processor 202 may then power off the first drive 104. The processor 202 may receive the read request 109, such as from the client device 101 in FIG. 1, for reading the first set of data 110 from the first drive 104. In response to receiving the read request 109, the processor 202 can read the first set of data 110 from the cache 108, rather than reading the first set of data 110 from the first drive 104.

Figure 3:
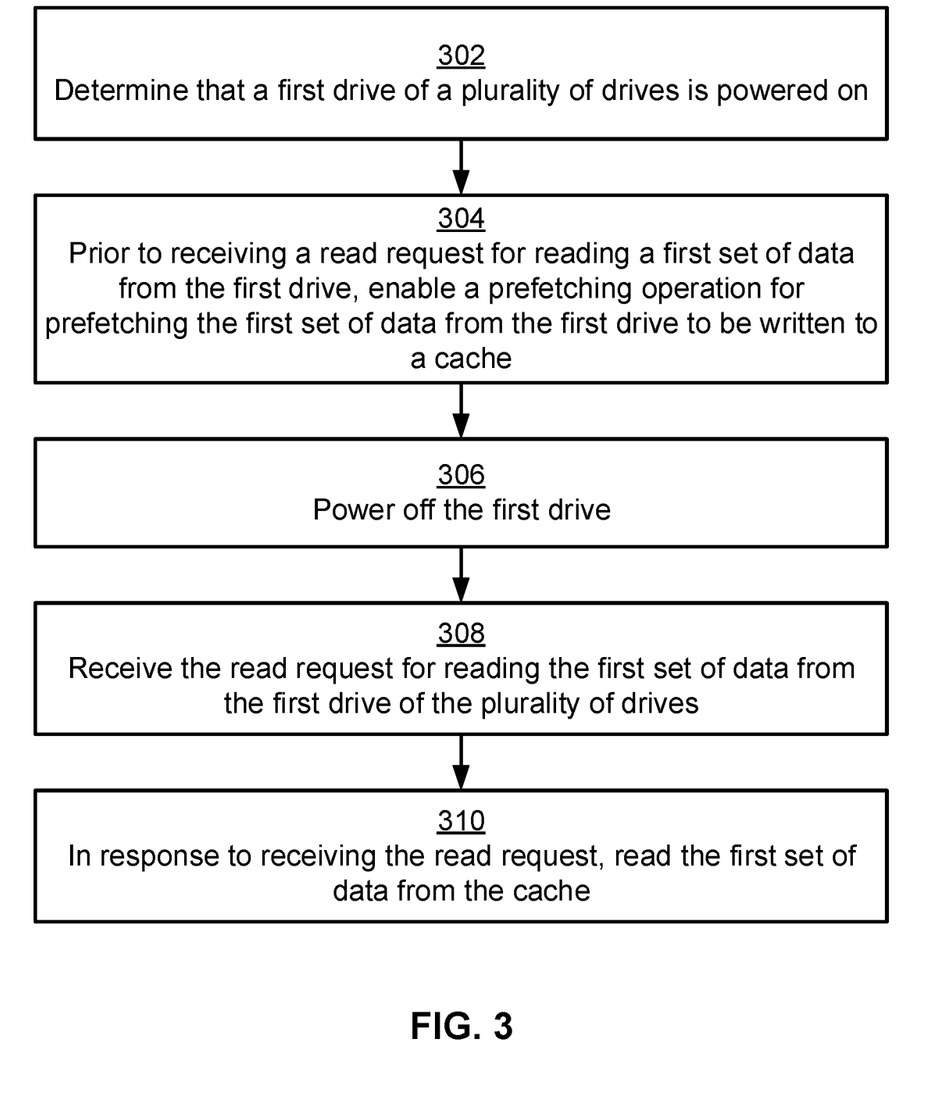
FIG. 3 is a flow chart showing an example of a process for managing prefetching operations for drives according to some aspects of the present disclosure.

The processor 202 can implement some or all of the steps shown in FIG. 3. Other examples can include more, fewer, or different steps than the steps depicted in FIG. 3. The steps below are described with reference to components described above with regard to FIGS. 1-2.

Turning to FIG. 3, in block 302 the processor 202 determines that the first drive 104 is powered on. In block 304, the processor 202 enables a prefetching operation 107 for prefetching the first set of data 110 from the first drive 104 to be written to the cache 108 prior to receiving a read request 109 for reading the first set of data 110 from the first drive 104. In some examples, the processor 202 may utilize a machine-learning application to determine that the first set of data 110 is likely to be requested in a future read request 109. In other examples, the processor 202 may determine that the first set of data 110 is likely to be requested in a future read request 109 based on previously received read requests. For example, if the first set of data 109 has been requested in a read request 109 more than a predetermined amount of times in a particular time frame, the processor 202 may prefetch the first set of data 110 to be written to the cache 108. Alternatively or additionally, the processor 202 may execute instructions 206 to automatically prefetch the first set of data 110 to be written to the cache 108 in response to the first drive 104 being powered on. While the first drive 104 is powered on, the processor 202 may significantly increase the number of prefetching operations 107 performed.

In block 306, the processor 202 powers off the first drive 104. In response to determining that the first drive 104 is powered off, the processor 202 may disable prefetching operations 107 for the first drive 104. In some examples, while the first drive 104 is powered off, the processor 202 may receive write requests 111 for a second set of data 116 to be written to the first drive 104. The write requests 111 may be received from the client device 101. The write requests 111 may be received intermittently over time, and the second set of data 116 may include all pending data requested in the write requests 111. Because the first drive 104 is powered off, the processor 202 may write the second set of data 116 to the cache 108, instead of powering on the first drive 104 to write the second set of data 116 to the first drive 104. Alternatively or additionally, the processor 202 may write the second set of data 116 to the second drive 106, which may be powered on. In some examples, some data in the second set of data 116 may be erasure coded and split between the cache 108 and the second drive 106 to increase redundancy in case of system failure leading to loss of data. In some examples, the second set of data 116 may include metadata indicating that the second set of data 116 should be written to the first drive 104.

The first drive 104 may remain powered off until the processor 202 determines that the first drive 104 should be powered on. For example, the processor 202 may determine that a number of write requests 111 exceeds a predetermined write request threshold 114. Additionally or alternatively, the processor 202 may determine that a storage amount in the cache 108 exceeds a predetermined storage threshold 112. As the cache 108 may have limited storage, it may be beneficial to remove the second set of data 116 from the cache 108. In each of these examples, the processor 202 may power on the first drive 104 to write the second set of data 116 to the first drive 104, at which point prefetching operations 107 for data in the first drive 104 may be enabled and increased as described above in block 302.

In block 308, the processor 202 receives the read request 109 for reading the first set of data 110 from the first drive 104. The first drive 104 may be powered off. In block 310, the processor 202 reads the first set of data 110 from the cache 108, in response to receiving the read request 109. Rather than powering on the first drive 104 to read the first set of data 110 from the first drive 104, the processor 202 may instead read the first set of data 110 from the cache 108. In some examples, the processor 202 may update a machine-learning application used to determine data to be retrieved in prefetching operations 107 prior to receiving read requests 109. The machine-learning application may be updated to include the successful prediction of a read request 109 requesting the first set of data 110 and subsequent prefetching of the first set of data 110 from the first drive 104.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processor; and
a memory including instructions that are executable by the processor for causing the processor to:
determine that a first drive of a plurality of drives of a distributed storage system has been powered on after being powered off in an idle state;
prior to receiving a read request for reading a first set of data from the first drive, automatically enable, in response to determining that the first drive has been powered on after being powered off and based on an amount of previously received read requests for the first set of data, a prefetching operation for prefetching the first set of data from the first drive to be written to a cache in the distributed storage system; and
subsequent to automatically enabling the prefetching operation:
power off the first drive to the idle state;
receive the read request for reading the first set of data from the first drive of the plurality of drives; and
in response to receiving the read request, read the first set of data from the cache.

2. The system of claim 1, wherein the memory further comprises instructions that are executable by the processor for causing the processor to:
determine that the first drive is powered off; and
in response to determining that the first drive is powered off, disable the prefetching operation for prefetching the first set of data from the first drive to be written to the cache prior to receiving the read request for reading the first set of data from the first drive.

3. The system of claim 1, wherein the memory further comprises instructions that are executable by the processor for causing the processor to:
receive a plurality of write requests for writing a second set of data to the first drive of the plurality of drives, the first drive being powered off in the idle state; and
in response to receiving the plurality of write requests, write the second set of data to the cache.

4. The system of claim 3, wherein the memory further comprises instructions that are executable by the processor for causing the processor to:
determine that a number of the plurality of write requests exceeds a predetermined write request threshold;
in response to determining that the number of the plurality of write requests exceeds the predetermined write request threshold, power on the first drive from being powered off in the idle state; and
write the second set of data stored in the cache to the first drive.

5. The system of claim 3, wherein the memory further comprises instructions that are executable by the processor for causing the processor to:
determine that a storage amount in the cache exceeds a predetermined storage threshold;
in response to determining that the storage amount in the cache exceeds the predetermined storage threshold, power on the first drive from being powered off in the idle state; and
write the second set of data stored in the cache to the first drive.

6. The system of claim 5, wherein the memory further comprises instructions that are executable by the processor for causing the processor to:
in response to determining that the storage amount in the cache exceeds the predetermined storage threshold, write the second set of data stored in the cache to a second drive of the plurality of drives that is powered on;
determine that the first drive is powered on after being powered off in the idle state; and in response to determining that the first drive is powered on after being powered off in the idle state, write the second set of data stored in the second drive to the first drive.

7. The system of claim 1, wherein the cache is a battery-backed cache or a nonvolatile random-access memory.

8. A method comprising:
determining, by a processor, that a first drive of a plurality of drives has been powered on after being powered off in an idle state;
prior to receiving a read request for reading a first set of data from the first drive, automatically enabling, by the processor and in response to determining that the first drive has been powered on after being powered off and based on an amount of previously received read requests for the first set of data, a prefetching operation for prefetching the first set of data from the first drive to be written to a cache; and
subsequent to automatically enabling the prefetching operation:
powering off, by the processor, the first drive to the idle state;
receiving, by the processor, the read request for reading the first set of data from the first drive of the plurality of drives; and
in response to receiving the read request, reading, by the processor, the first set of data from the cache.

9. The method of claim 8, further comprising:
determining that the first drive is powered off; and
in response to determining that the first drive is powered off, disabling the prefetching operation for prefetching the first set of data from the first drive to be written to the cache prior to receiving the read request for reading the first set of data from the first drive.

10. The method of claim 8, further comprising:
receiving a plurality of write requests for writing a second set of data to the first drive of the plurality of drives, the first drive being powered off in the idle state; and
in response to receiving the plurality of write requests, writing the second set of data to the cache.

11. The method of claim 10, further comprising:
determining that a number of the plurality of write requests exceeds a predetermined write request threshold;
in response to determining that the number of the plurality of write requests exceeds the predetermined write request threshold, powering on the first drive from being powered off in the idle state; and
writing the second set of data stored in the cache to the first drive.

12. The method of claim 10, further comprising:
determining that a storage amount in the cache exceeds a predetermined storage threshold;
in response to determining that the storage amount in the cache exceeds the predetermined storage threshold, powering on the first drive from being powered off in the idle state; and
writing the second set of data stored in the cache to the first drive.

13. The method of claim 12, further comprising:
in response to determining that the storage amount in the cache exceeds the predetermined storage threshold, writing the second set of data stored in the cache to a second drive of the plurality of drives that is powered on;
determining that the first drive is powered on after being powered off in the idle state; and in response to determining that the first drive is powered on after being powered off in the idle state, writing the second set of data stored in the second drive to the first drive.

14. The method of claim 8, wherein the cache is a battery-backed cache or a nonvolatile random-access memory.

15. A non-transitory computer-readable medium comprising program code that is executable by a processor for causing the processor to:
determine that a first drive of a plurality of drives has been powered on after being powered off in an idle state;
prior to receiving a read request for reading a first set of data from the first drive, automatically enable, in response to determining that the first drive has been powered on after being powered off and based on an amount of previously received read requests for the first set of data, a prefetching operation for prefetching the first set of data from the first drive to be written to a cache; and
subsequent to automatically enabling the prefetching operation:
power off the first drive to the idle state;
receive the read request for reading the first set of data from the first drive of the plurality of drives; and
in response to receiving the read request, read the first set of data from the cache.

16. The non-transitory computer-readable medium of claim 15, further comprising program code that is executable by the processor for causing the processor to:
determine that the first drive is powered off; and
in response to determining that the first drive is powered off, disable the prefetching operation for prefetching the first set of data from the first drive to be written to the cache prior to receiving the read request for reading the first set of data from the first drive.

17. The non-transitory computer-readable medium of claim 15, further comprising program code that is executable by the processor for causing the processor to:
receive a plurality of write requests for writing a second set of data to the first drive of the plurality of drives, the first drive being powered off in the idle state; and
in response to receiving the plurality of write requests, write the second set of data to the cache.

18. The non-transitory computer-readable medium of claim 17, further comprising program code that is executable by the processor for causing the processor to:
determine that a number of the plurality of write requests exceeds a predetermined write request threshold;
in response to determining that the number of the plurality of write requests exceeds the predetermined write request threshold, power on the first drive from being powered off in the idle state; and
write the second set of data stored in the cache to the first drive.

19. The non-transitory computer-readable medium of claim 17, further comprising program code that is executable by the processor for causing the processor to:
determine that a storage amount in the cache exceeds a predetermined storage threshold;
in response to determining that the storage amount in the cache exceeds the predetermined storage threshold, power on the first drive from being powered off in the idle state; and
write the second set of data stored in the cache to the first drive.

20. The non-transitory computer-readable medium of claim 19, further comprising program code that is executable by the processor for causing the processor to:
  in response to determining that the storage amount in the cache exceeds the predetermined storage threshold, write the second set of data stored in the cache to a second drive of the plurality of drives that is powered on;
  determine that the first drive is powered on after being powered off in the idle state; and
  in response to determining that the first drive is powered on after being powered off in the idle state, write the second set of data stored in the second drive to the first drive.

* * * * *